United States Patent
Sugano et al.

(10) Patent No.: US 7,966,119 B2
(45) Date of Patent: *Jun. 21, 2011

(54) VEHICLE HEADWAY MAINTENANCE ASSIST SYSTEM AND METHOD

(75) Inventors: Takeshi Sugano, Yokohama (JP); Kenichi Egawa, Tama (JP); Satoshi Tange, Fujisawa (JP); Yosuke Kobayashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/882,666

(22) Filed: Sep. 15, 2010

(65) Prior Publication Data

US 2011/0004387 A1    Jan. 6, 2011

Related U.S. Application Data

(63) Continuation of application No. 11/684,281, filed on Mar. 9, 2007, now Pat. No. 7,822,526.

(30) Foreign Application Priority Data

Mar. 10, 2006 (JP) ................................ 2006-066584
Jan. 19, 2007 (JP) ................................ 2007-010208

(51) Int. Cl.
*B60K 31/00* (2006.01)
(52) U.S. Cl. ......................................... 701/96; 701/301
(58) Field of Classification Search .................. None
See application file for complete search history.

(56) References Cited

U.S. PATENT DOCUMENTS

| 5,244,257 | A | 9/1993 | Müller et al. |
| 6,389,347 | B1 | 5/2002 | Nozaki |
| 6,574,541 | B2 | 6/2003 | Katakura et al. |
| 7,570,156 | B2 | 8/2009 | Cicilloni et al. |
| 2003/0236624 | A1 | 12/2003 | Kimura et al. |

FOREIGN PATENT DOCUMENTS

| EP | 1 158 219 A2 | 11/2001 |
| EP | 1 375 232 A1 | 1/2004 |
| EP | 1 375 234 A2 | 1/2004 |
| JP | H02-269401 A | 11/1990 |
| JP | 5-500485 A | 2/1993 |
| JP | 8-230499 A | 9/1996 |
| JP | 10-166890 A | 6/1998 |

(Continued)

OTHER PUBLICATIONS

The Office Action of corresponding Japanese Application No. 2007-010208, dated Dec. 28, 2010.

*Primary Examiner* — Michael J. Zanelli
(74) *Attorney, Agent, or Firm* — Global IP Counselors, LLP

(57) ABSTRACT

A vehicle headway maintenance assist system is provided that provides a haptic notification to an accelerator to alert the driver under prescribed conditions. The vehicle headway maintenance assist system includes a preceding vehicle detection section, a reaction force generating section, and a control section. The preceding vehicle detection section is configured to detect a headway distance between a host vehicle and a preceding vehicle. The reaction force generating section is configured to generate a reaction force based on the headway distance detected by the preceding vehicle detection section. The control section is configured to control a relationship between a driving force and an accelerator actuation amount by a driver to increase the accelerator actuation amount at a time before the reaction force generating section generates the reaction force.

20 Claims, 14 Drawing Sheets

FOREIGN PATENT DOCUMENTS

| | | |
|---|---|---|
| JP | 2004-164189 A | 6/2004 |
| JP | 2005-008147 A | 1/2005 |
| JP | 2005-138765 A | 6/2005 |
| JP | 2005-240751 A | 9/2005 |
| JP | 2005-254857 A | 9/2005 |
| JP | 2005-255166 A | 9/2005 |
| JP | 2005-329944 A | 12/2005 |
| JP | 2006-51922 A | 2/2006 |

VEHICLE HEADWAY MAINTENANCE ASSIST SYSTEM AND METHOD

CROSS-REFERENCE TO RELATED APPLICATIONS

This application is a continuation of prior U.S. patent application Ser. No. 11/684,281, filed Mar. 9, 2007, and claims priority to Japanese Patent Application Nos. 2006-066584, filed on Mar. 10, 2006 and 2007-010208, filed on Jan. 19, 2007. The entire disclosures of U.S. patent application Ser. No. 11/684,281, and Japanese Patent Application Nos. 2006-066584 and 2007-010208 are hereby incorporated herein by reference.

BACKGROUND OF THE INVENTION

1. Field of the Invention

The present invention generally relates to an assistance technique for maintaining a headway distance between a host vehicle and a preceding vehicle. More specifically, the present invention relates to maintaining a headway distance from a preceding vehicle based on a running condition of the host vehicle and providing a haptic signal in the accelerator.

2. Background Information

Vehicle assist systems have been proposed to alert a driver in accordance with a reduction in a headway distance, and assist in the maintenance of headway distance. In Japanese Laid-Open Patent Application No. 2005-8147, it has been proposed to alert the driver of the reduction in the headway distance by increasing the reaction force of the accelerator in accordance with a reduction in headway distance.

In view of the conventional headway maintenance assist systems, it will be apparent to those skilled in the art from this disclosure that there exists a need for an improved vehicle headway maintenance assist system. This invention addresses this need in the art as well as other needs, which will become apparent to those skilled in the art from this disclosure.

SUMMARY OF THE INVENTION

However, it has been discovered that when the accelerator position is at a low setting such as when the vehicle speed is low, i.e., when the accelerator is being lightly pressed, the driver does not easily recognize when a reaction force is being applied to the accelerator. Thus, the driver may not be alerted of the reduction in the headway distance to a preceding vehicle.

In accordance with one aspect of the present invention, a vehicle headway maintenance assist system is provided that basically comprises a preceding vehicle detection section, a reaction force generating section, and a control section. The preceding vehicle detection section is configured to detect a headway distance between a host vehicle and a preceding vehicle. The reaction force generating section is configured to generate a reaction force based on the headway distance detected by the preceding vehicle detection section. The control section is configured to control a relationship between a driving force and an accelerator actuation amount by a driver to increase the accelerator actuation amount at a time before the reaction force generating section generates the reaction force.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
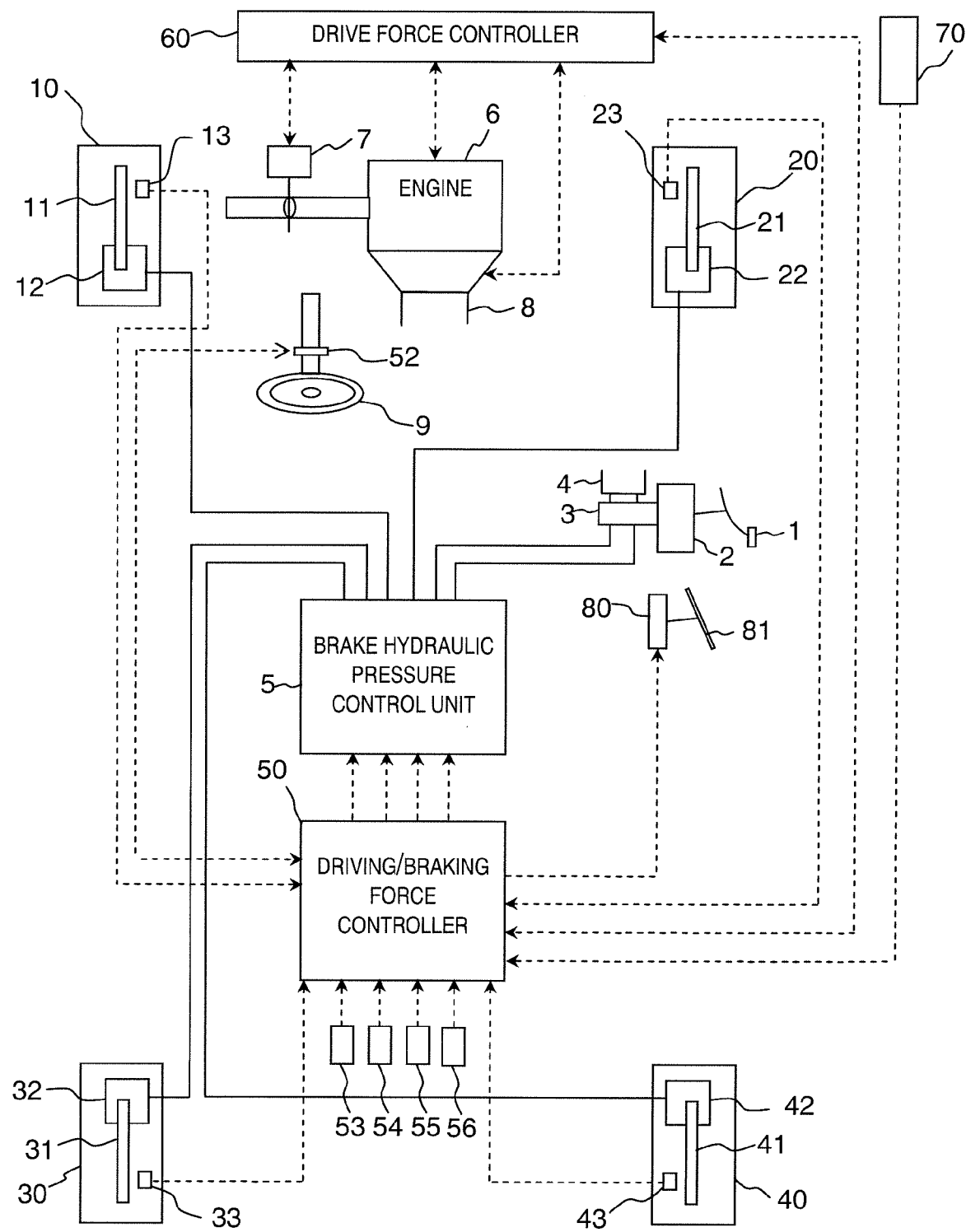
FIG. 1 is a vehicle is schematically illustrated with a vehicle headway maintenance assist system in accordance with a first embodiment of the present invention.

Referring initially to FIG. 1, a vehicle (hereinafter also called "the host vehicle") is schematically illustrated with a vehicle headway maintenance assist system in accordance with a first embodiment of the present invention. In this illustrated embodiment, the headway maintenance assist system is installed in the host vehicle that is a rear-wheel drive vehicle having an automatic transmission and a conventional differential gear. The host vehicle includes a hydraulic braking apparatus that uses a brake pedal 1, a booster 2, a master cylinder 3, a reservoir 4 and a pressure control unit 5 for the driver to input a target braking force to a left front wheel 10 via a brake disk 11 and a wheel cylinders 12, a right front wheel 20 via a brake disk 21 and a wheel cylinders 22, a left rear wheel 30 via a brake disk 31 and a wheel cylinders 32, and a right rear wheel 40 via a brake disk 41 and a wheel cylinders 42. In this host vehicle, the front wheels 10 and 20 and the rear wheels 30 and 40 are configured so that the braking force of the left and right wheels can be independently controlled. Thus, the brake disks 11, 21, 31 and 41 and the wheel cylinders 12, 22, 32 and 42 are configured and arranged in a conventional manner such that the wheel cylinders 12, 22, 32 and 42 frictional hold a corresponding one of the brake disk disks 11, 21, 31 and 41 for imparting a brake force (braking force) to each wheel by supplying hydraulic braking pressure to each of the wheel cylinders 12, 22, 32 and 42 of the wheels 10, 20, 30 and 40.

The pressure control unit 5 is disposed between the master cylinder 3 and the wheel cylinders 12, 22, 32 and 42. Hydraulic pressure that has been increased by the master cylinder 3 is supplied to each of the wheel cylinders 12, 22, 32 and 42 in accordance with the amount by which the driver depresses the brake pedal 1. The pressure control unit 5 individually controls the brake fluid pressure of the wheel cylinders 12, 22, 32 and 42. The pressure control unit 5 has actuators for forming separate front, rear, left, and right hydraulic pressure supply systems (channels). Thus, the wheels 10, 20, 30 and 40 are thereby separately braked. The actuators are configured using proportion solenoid valves so that, e.g., the hydraulic pressure of the wheel cylinders 12, 22, 32 and 42 can be set to an arbitrary brake fluid pressure.

The host vehicle includes an engine 6, a throttle control device 7, an automatic transmission 8 and a steering wheel 9 as well as other conventional power train components. The host vehicle also includes a driving/braking force controller 50 and a drive force controller 60. The drive force controller 60 is configured to control a drive force (driving force) of the rear (drive) wheels 30 and 40 based on a drive force instruction value inputted from the driving/braking force controller 50. The driving/braking force controller 50 is configured to perform engine control by controlling an amount of fuel injected into the engine 6, for controlling the throttle position with the throttle control device 7, for controlling the automatic transmission 8, as well as other conventional components relating the engine 6. Thus, the drive force of the rear (drive) wheels 30 and 40 is based on this control of the engine 6.

The host vehicle further includes a plurality of wheel speed sensors 13, 23, 33 and 43, a steering angle sensor 52, an acceleration sensor 53, a yaw rate sensor 54, a master cylinder fluid pressure sensor 55 and an accelerator pedal position sensor 56. The signals from the sensors 13, 23, 33, 43, and 52 to 56 are inputted to the driving/braking force controller 50. In particular, the wheel speed sensors 13, 23, 33 and 43 constitute a wheel speed detection section that is configured and arranged to detect the rotational wheel speeds Vw1, Vw2, Vw3, Vw4 of the wheels and send a signal indicative of the wheel speeds to the driving/braking force controller 50. The steering angle sensor 52 constitutes a steering angle detection section that is configured and arranged to detect a steering angle δ of the steering wheel 9 and send a signal indicative of the steering angle to the driving/braking force controller 50. The acceleration sensor 53 constitutes an acceleration detection section that is configured and arranged to detect the longitudinal acceleration Xg of the vehicle and the transverse acceleration Yg of the vehicle and send a signal indicative of the longitudinal and transverse accelerations of the vehicle to the driving/braking force controller 50. The yaw rate sensor 54 constitutes a yaw rate detection section that is configured and arranged to detect the yaw rate generated in the vehicle and send a signal indicative of the yaw rate to the driving/braking force controller 50. The master cylinder fluid pressure sensor 55 constitutes a master cylinder fluid pressure detection section that is configured and arranged to detect the master cylinder fluid pressure Pm and send a signal indicative of the master cylinder fluid pressure to the driving/braking force controller 50. The accelerator pedal position sensor 56 constitutes an accelerator pedal position detection section that is configured and arranged to detect the accelerator pedal position and send a signal indicative of the accelerator pedal position to the driving/braking force controller 50.

The drive force controller 60 is configured to calculate an engine torque τa, a desired drive force or torque τm based on the amount by which the accelerator pedal 1 is depressed by the driver, and a drive force or torque τw in the drive wheel shaft. The engine torque τa, the desired drive force τm and the drive force τw are inputted from the drive force controller 60 to the driving/braking force controller 50.

The host vehicle further includes a laser radar 70, which for example is mounted in a front portion of the host vehicle such as in the front grill, the front bumper or in some other appropriate location of the vehicle. The laser radar 70 detects the headway distance L from the preceding vehicle and the relative speed Vr by sending laser light out in front of the host vehicle and receiving the light that is reflected back off the preceding vehicle located in front of the host vehicle. The relative speed Vr is a value obtained by subtracting the speed of the preceding vehicle from the speed of the host vehicle. The headway distance L and the relative speed Vr detected by the laser radar 70 are sent to the driving/braking force controller 50. Thus, the laser radar 70 constitutes a preceding vehicle detection section that is configured and arranged to detect the headway distance L and the relative speed Vr, and then send a signal indicative of the headway distance and the relative speed to the driving/braking force controller 50.

The host vehicle further includes an accelerator pedal actuator 80 and an accelerator pedal 81. The accelerator pedal actuator 80 is configured and arranged to impart a reaction force to the accelerator pedal 81 based on a command from the driving/braking force controller 50. As used herein, the term "reaction force" refers to force that is applied in a direction opposite to the direction in which the driver depresses the accelerator pedal 81. Thus, the accelerator pedal actuator 80 constitutes a haptic information conveying section that is configured and arranged to convey a risk potential to a driver as haptic information through the accelerator pedal 81, which constitutes a driver-operated driving operation device.

In the headway maintenance assist system in the illustrated embodiment of the present invention, when the headway distance L between the host vehicle and the preceding vehicle is less than a first headway distance threshold L*1, a headway maintenance assistance control is performed in accordance with the operation of the accelerator pedal 81. In particular, when the driver is not operating (depressing) the acceleration pedal 81, the headway maintenance assistance control includes a primary deceleration control that is performed to decelerate the vehicle when the headway distance L is less than the first headway distance threshold L*1 and a secondary deceleration control that is performed to decelerate the vehicle when the headway distance L is less than a second headway distance threshold L*2, which is less than the first headway distance threshold L*1. However, if the driver is operating the accelerator pedal 81 when the headway distance L is less than the second headway distance threshold L*2 (L*2<L*1), then a reaction force is applied to the accelerator pedal 81.

According to the present invention, it is possible to positively notify the driver that the reaction force has been applied to the accelerator pedal 81 because the relationship between the drive force of the host vehicle and the accelerator pedal position is corrected based on the detected running condition of the host vehicle so that the driver can more readily notice an accelerator actuation reaction force. In other words, in the present invention, the running condition of the host vehicle and the accelerator pedal actuation amount are detected, and a relationship between the target drive force of the host vehicle and a predetermined accelerator pedal actuation amount is corrected based on the running condition of the host vehicle. However, an acceleration control corresponding to the preceding vehicle is not necessarily performed when the preceding vehicle accelerates. Thus, the headway maintenance assist system as described herein is not equipped with an acceleration control program to maintain a prescribed following distance from the preceding vehicle (e.g., an adaptive cruise control). Of course, an adaptive cruise control could be included if needed and/or desired.

The detailed processes of the headway maintenance assist system will now be described with reference to FIGS. 2 through 10.

Figure 2:
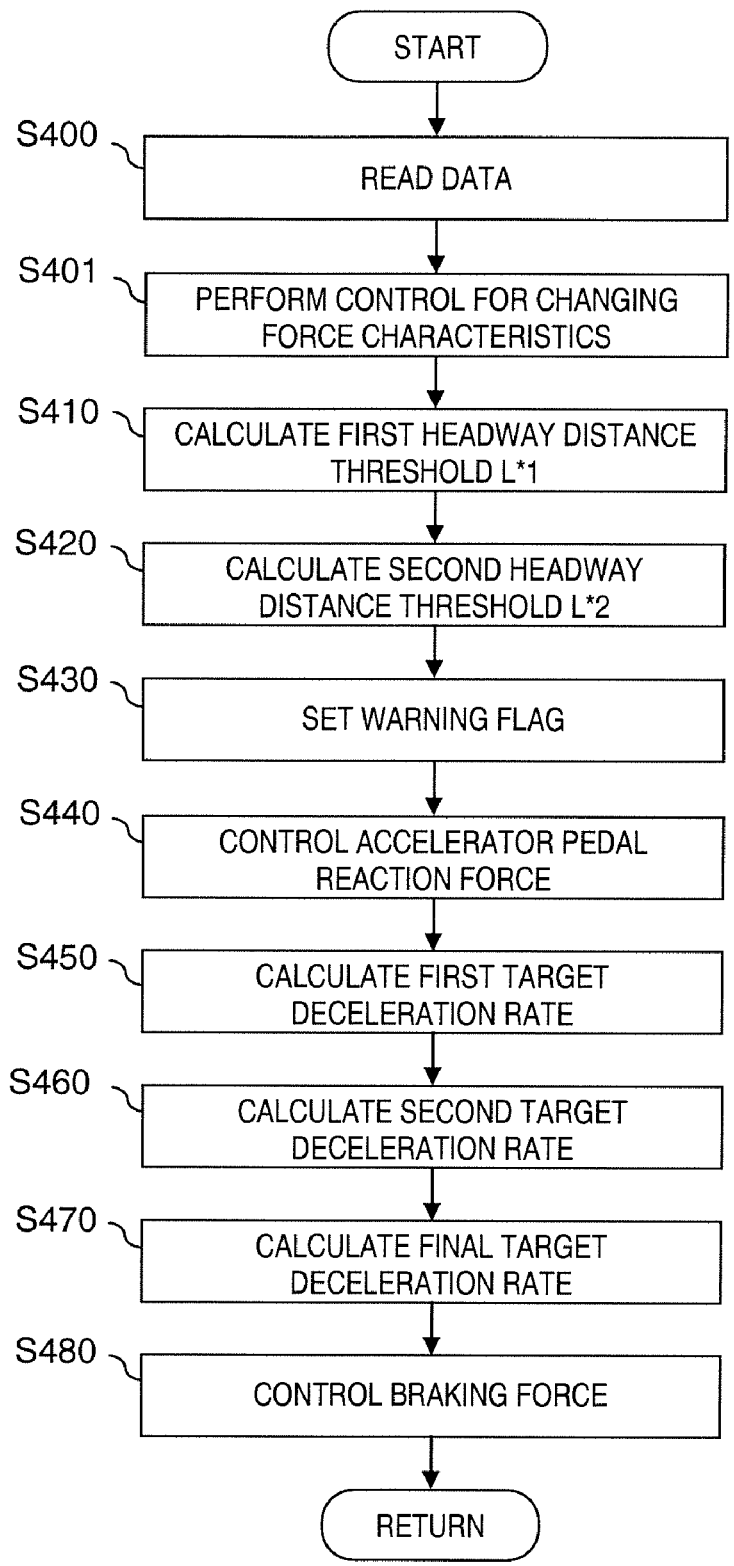
FIG. 2 is a flowchart showing the processing executed by the headway maintenance assist system in accordance with the first embodiment of the present invention.

FIG. 2 is a flowchart showing the process performed by the headway maintenance assist system in the illustrated embodiment. When the host vehicle is started up, the driving/braking force controller 50 initiates the process step S400. In step S400, the following data is read, e.g., the accelerator pedal position Acc detected by the accelerator pedal position sensor 56, the wheel speeds Vw1, Vw2, Vw3, Vw4 detected by the wheel speed sensors 13, 23, 33 and 43, and the headway distance L and the relative speed Vr with respect to the preceding vehicle as detected by the laser radar 70. The process then advances to step S401.

In step S401, the driving/braking force controller 50 executes a torque or force characteristic correction control that makes adjustments to the force characteristic by changing the relationship between the accelerator pedal 81 and the drive force in accordance with the current running condition of the host vehicle. The specifics of the routine for controlling changes in the relationship between the accelerator pedal and the drive force are described in detail later with reference to the flowchart shown in FIG. 7. After the relationship between the position of the accelerator pedal and the drive force has been changed in step S401, the process advances to step S410.

In step S410, a first headway distance threshold L*1 is calculated. The first headway distance threshold L*1 is calculated from the sum of a steady-state term L*h1, which does not depend on the running condition of the host vehicle, and a transient term L*r1, which depends on the running condition of the host vehicle. The specific method for calculating the first headway distance threshold L*1 will be described using the flowchart shown in FIG. 3.

Figure 3:
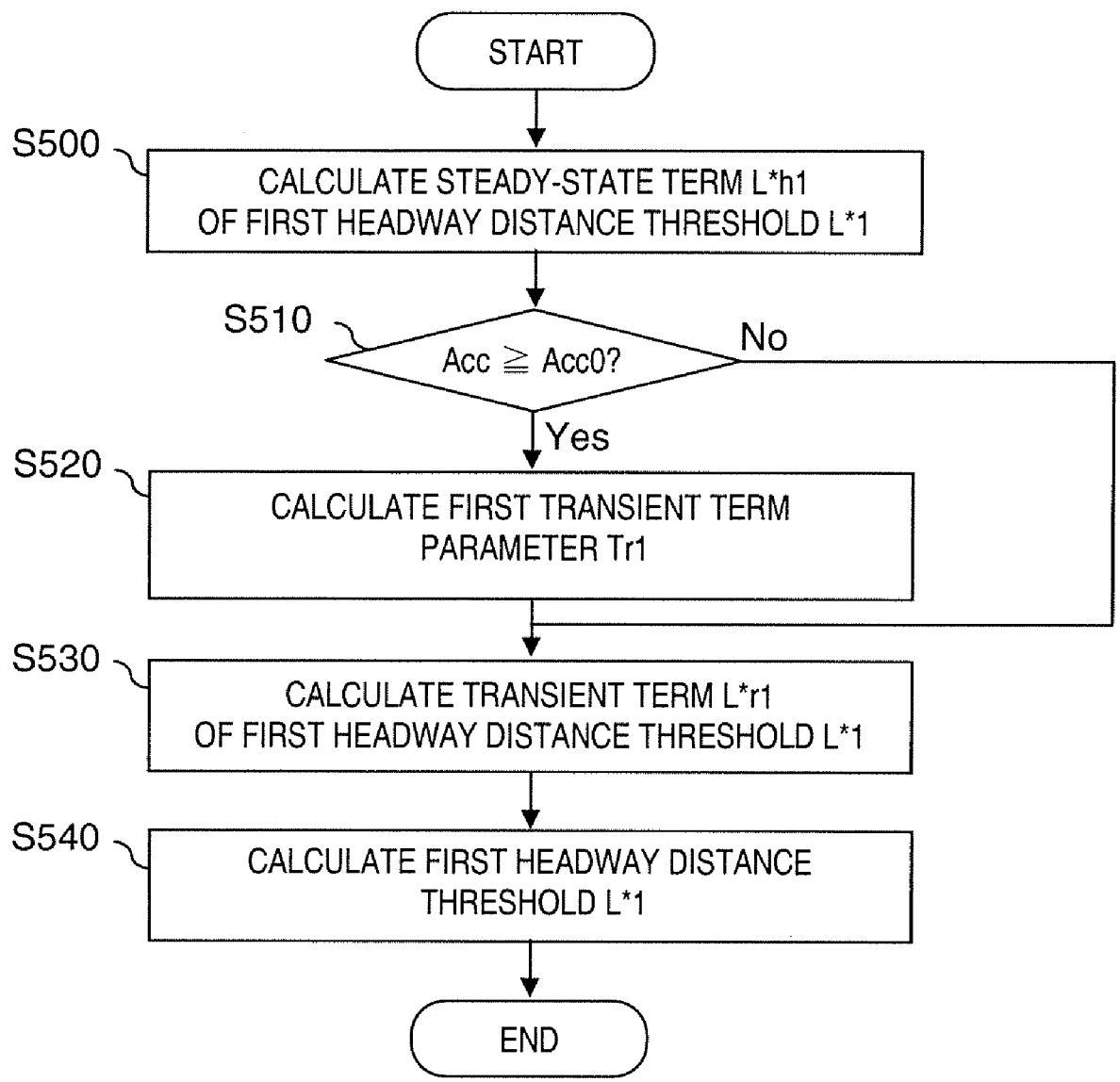
FIG. 3 is a flowchart showing the processing executed for calculating the first headway distance threshold L*1 in the headway maintenance assist system of the first embodiment of the present invention.

In step S500 of the flowchart shown in FIG. 3, the steady-state term L*h1 is calculated according to Equation 1 below.

$$L*h1 = Va \times Th \quad \text{(Equation 1)}$$

In this Equation 1, the parameter Va represents the speed of the preceding vehicle as calculated based on the speed V of the host vehicle and the relative speed Vr, while the parameter Th represents a specific headway time of the host vehicle. The speed V of the host vehicle is calculated by determining a mean value of the speeds Vw1 and Vw2 of the front wheels as detected by the vehicle speed sensors 13 and 23.

In step S510, which follows step S500, the driving/braking force controller 50 determines whether the accelerator pedal position Acc detected by the accelerator pedal position sensor 56 is equal to or greater than a specific accelerator pedal position threshold Acc0. If the accelerator pedal position Acc is determined to be equal to or greater than the specific accelerator pedal position threshold Acc0, then it is determined that the driver is depressing on the accelerator pedal 81. Thus, an accelerator operation flag Facc is turned "on" when it is determined that the driver is depressing on the accelerator pedal 81, and then the process advances to step S520. If the accelerator pedal position Acc is determined to be less than the specific accelerator pedal position threshold Acc0, then it is determined that the driver is not depressing on the accelerator pedal 81. Thus, the accelerator operation flag Facc is turned "off" when it is determined that the driver is not depressing on the accelerator pedal 81, and then the process advances to step S530.

In step S520, Equation 2 is used to calculate a first transient term parameter Tr1 for calculating the transient term L*r1 of the first headway distance threshold L*1.

$$Tr1 = (L - L*h1)/Vr \quad \text{(Equation 2)}$$

In this Equation 2, the first transient term parameter Tr1 is the time taken for the headway distance L to reach the steady-state term L*h1 of the first headway distance threshold, assuming that the current relative speed Vr is maintained. When the parameter Tr1 is calculated, the process advances to step S530.

As can be seen from the process in steps S510 and S520, the first transient term parameter Tr1 for calculating the transient term L*r1 of the first headway distance threshold is calculated (renewed) only when the accelerator operation flag Facc is turned on. Therefore, the first transient term parameter Tr1 is set according to the actual headway distance L when the accelerator pedal 81 is being depressed, and the parameter value that was in effect when the accelerator pedal 81 ceased to be depressed is maintained when the accelerator pedal 81 is not being depressed.

In step S530, the transient term L*r1 of the first headway distance threshold L*1 is calculated according to Equation 3, and the process advances to step S540.

$$L*r1 = Tr1 \times Vr \quad \text{(Equation 3)}$$

In step S540, the first headway distance threshold L*1 is calculated by adding together the steady-state term L*h1 of the first headway distance threshold calculated in step S500, and the transient term L*r1 of the headway distance threshold calculated in step S520 (see Equation 4).

$$L*1 = L*h1 + L*r1 \quad \text{(Equation 4)}$$

When the accelerator pedal 81 is being depressed (when the accelerator operation flag Facc is turned on), L*1=L according to Equations 2, 3, and 4. After the first headway distance threshold L*1 is calculated, then the process advances to step S420 in the flowchart shown in FIG. 2.

Figure 13:
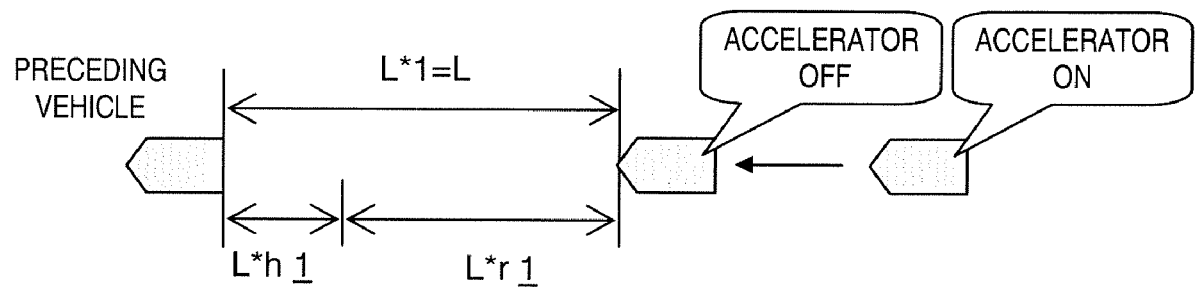
FIG. 13 is a diagram showing the headway distance threshold L* when the driver ceases to operate (depress) the accelerator pedal.

FIG. 13 is a diagram showing the headway distance threshold L*1 when the driver ceases to depress on the accelerator pedal 81 (i.e., when the accelerator operation flag Facc is turned from "on" to "off"). The headway distance threshold L*1 is set to the headway distance L at the time the accelerator pedal 81 ceases to be depressed, as shown in FIG. 13.

In step S420, the second headway distance threshold L*2 is calculated. The second headway distance threshold L*2 is calculated from the sum of a steady-state term L*h2 calculated regardless of whether the preceding vehicle is decelerating or not and a transient term L*r2 calculated (updated) when the preceding vehicle is decelerating. The specific method for calculating the second headway distance threshold L*2 will now be described using the flowchart shown in FIG. 4.

Figure 4:
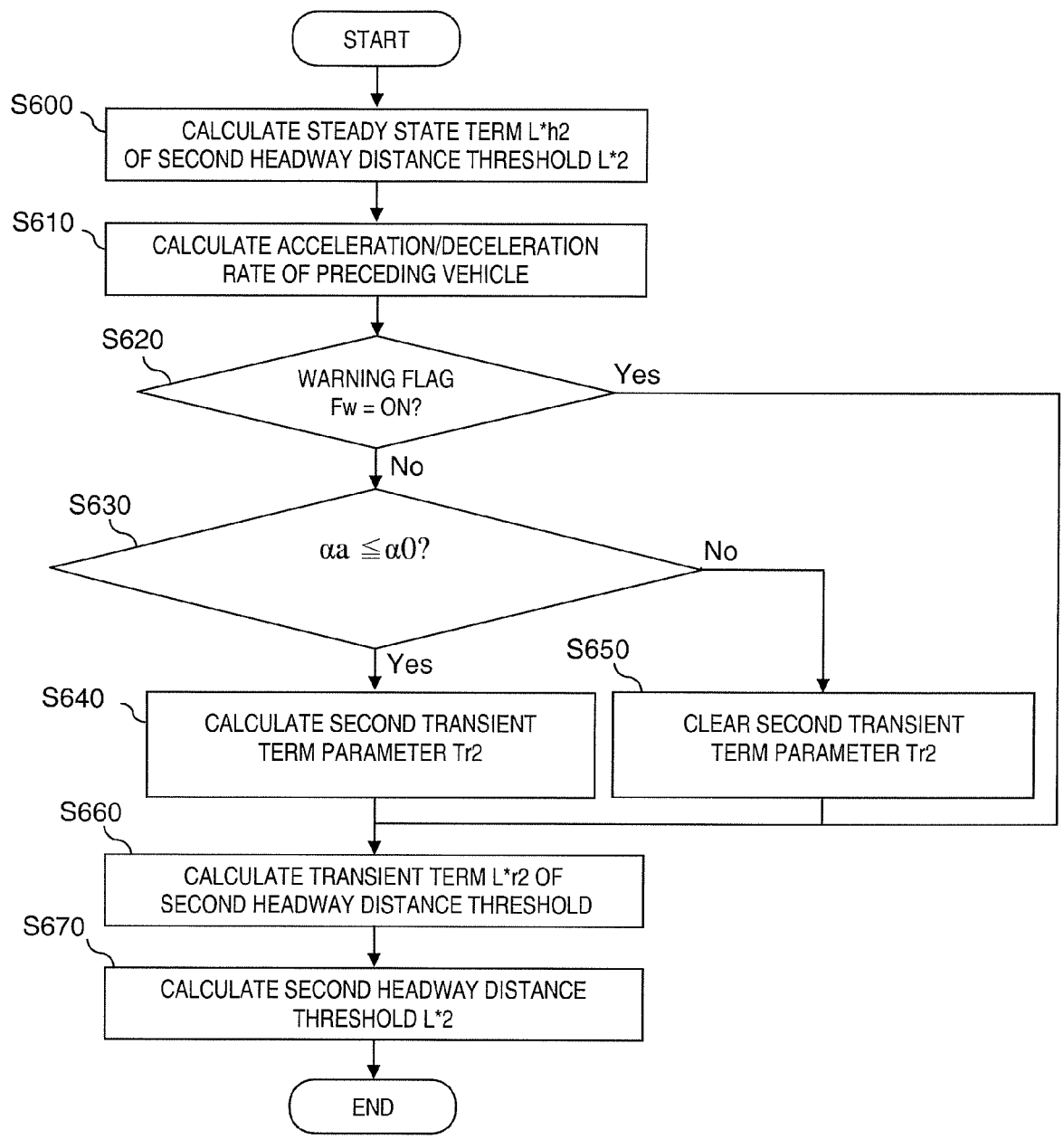
FIG. 4 is a flowchart showing the processing executed for calculating the second headway distance threshold L*2 in the headway maintenance assist system of the first embodiment of the present invention

In step S600 in the flowchart shown in FIG. 4, the steady-state term L*h2 is calculated based on the speed V of the host vehicle and the relative speed Vr. The function for calculating the steady-state term L*h2 is provided in advance based on the host vehicle speed V and the relative speed Vr. Thus, the steady-state term L*h2 is calculated by substituting the host vehicle speed V and the relative speed Vr into this function. When the steady-state term L*h2 of the second headway distance threshold is calculated, the process advances to step S610.

In step S610, the acceleration/deceleration rate αa of the preceding vehicle is calculated, the process advances to step S620. In step S620, a determination is made as to whether a warning flag Fw, which is set in a later-described step S430 (see FIG. 2), has been turned on. The processes in steps S400 through S480 are repeated, and therefore, the determination in step S620 is made in this case based on the state of the warning flag Fw set during the preceding process. When the warning flag Fw is determined to be "on", the process advances to step S660, and when the warning flag Fw is determined to be "off", the process advances to step S630.

In step S630, the driving/braking force controller 50 determines whether the acceleration/deceleration rate αa of the preceding vehicle as calculated in step S610 is equal to or less than a specific acceleration/deceleration rate α0. The specific acceleration/deceleration rate α0 is a threshold for determining whether the preceding vehicle is decelerating or accelerating. Thus, the values of rates αa and α0 are both positive during acceleration and both negative during deceleration. When the acceleration/deceleration rate αa of the preceding vehicle is determined to be equal to or less than the specific acceleration/deceleration rate α0, the driving/braking force controller 50 determines that the preceding vehicle is decelerating, a preceding vehicle deceleration flag Fdec_a is turned "on", and the process then advances to step S640. When the acceleration/deceleration rate αa of the preceding vehicle is determined to be greater than the specific acceleration/deceleration rate α0, the driving/braking force controller 50 determines that the preceding vehicle is not decelerating, the preceding vehicle deceleration flag Fdec_a is turned "off", and the process advances to step S650.

In step S640, a second transient term parameter Tr2 is calculated from Equation 5, below, for calculating the transient term L*r2 of the second headway distance threshold.

$$Tr2=(L-L*h2)/Vr \quad \text{(Equation 5)}$$

In this Equation 5, the second transient term parameter Tr2 is the time resulting from dividing the remaining distance (L−L*h2) by the relative speed Vr. The remaining distance is the actual headway distance L less the steady-state term L*h2 of the second headway distance threshold at the time when the preceding vehicle begins to decelerate. When the second transient term parameter Tr2 has been calculated, the process advances to step S660.

In step S650, which takes effect after it is determined that the preceding vehicle is not decelerating, the second transient term parameter Tr2 is cleared (i.e., set to 0) for calculating the transient term L*r2 of the second headway distance threshold, and the process advances to step S660.

In step S660, the transient term L*r2 of the second headway distance threshold is calculated from Equation 6, below, and the process advances to step S670.

$$L*r2=Tr2 \times Vr \quad \text{(Equation 6)}$$

In step S670, the second headway distance threshold L*2 is calculated by adding the steady-state term L*h2 and the transient term L*r2 of the second headway distance threshold (see Equation 7).

$$L*2=L*h2+L*r2 \quad \text{(Equation 7)}$$

In step S670, when the second headway distance threshold L*2 has been calculated, the process advances to step S430 in the flowchart shown in FIG. 2. In step S430, the warning flag Fw is set. Therefore, a deviation ΔL2 between the second headway distance threshold L*2 calculated in step S420 and the headway distance L from the preceding vehicle detected by the laser radar 70 is first calculated using Equation 8, below.

$$\Delta L2=L*2-L \quad \text{(Equation 8)}$$

If the deviation ΔL2 calculated from Equation 8 is equal to or greater than 0, the headway distance L from the preceding vehicle is equal to or less than the second headway distance threshold L*2, and the warning flag Fw is therefore turned "on" in step S430. If the deviation ΔL2 is less than 0, the warning flag Fw is turned "off" in step S430. The process then advances to step S440 after the warning flag Fw has been set.

In step S440, accelerator pedal reaction force control is implemented in which the reaction force is applied to the accelerator pedal 81 in accordance with the deviation ΔL2 in the headway distance. The detailed processes of this control accelerator pedal reaction force for applying reaction force to the accelerator pedal 81 are described using the flowchart shown in FIG. 5.

Figure 5:
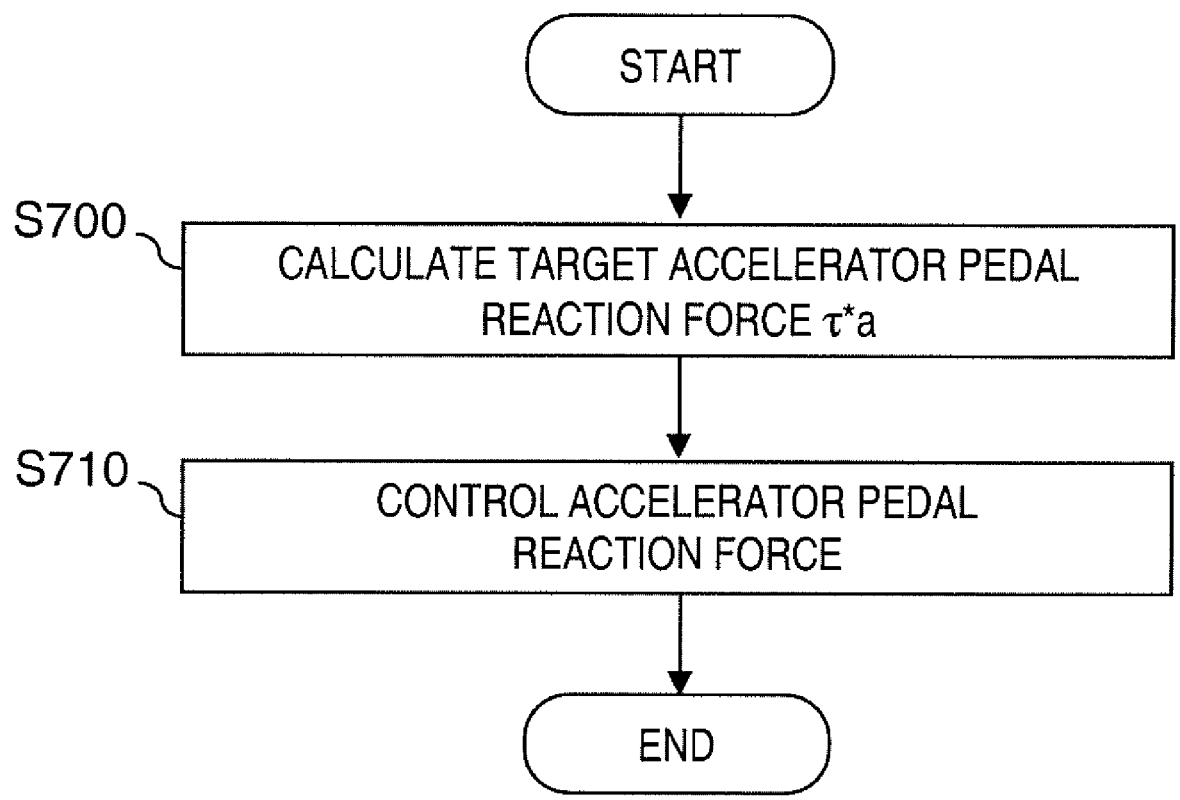
FIG. 5 is a flowchart showing the processing executed for controlling the reaction force that is imparted to the accelerator pedal in the headway maintenance assist system of the first embodiment.

In step S700 of the flowchart shown in FIG. 5, the target accelerator pedal reaction force τ*a is calculated from Equation 9.

$$\tau*a=Kp \times \Delta L2 \quad \text{(Equation 9)}$$

The value Kp (Kp>0) in Equation 9 is a specific gain for calculating the target accelerator pedal reaction force τ*a from the headway distance deviation ΔL2.

In step S710, which follows step S700, the accelerator pedal actuator 80 is instructed to subject the accelerator pedal 81 to a reaction force corresponding to the target accelerator pedal reaction force τ*a calculated in step S700. Having received this instruction, the accelerator pedal actuator then applies a reaction force corresponding to the target accelerator pedal reaction force τ*a to the accelerator pedal 81. As is clear from Equation 9, the reaction force is applied to the accelerator pedal 81 when the headway distance deviation ΔL2 is positive; i.e., when the headway distance L is less than the headway distance threshold L*2. When the process in step S710 is complete, the process advances to step S450 in the flowchart shown in FIG. 2.

In step S450, a first target deceleration rate α*1 is calculated from Equation 10 based on the first headway distance threshold L*1 calculated in step S410 and based on the headway distance L from the preceding vehicle detected by the laser radar 70.

$$\alpha*1=Kv \times Kr1 \times (L*1-L) \quad \text{(Equation 10)}$$

The value Kr1 is the gain for calculating the first target deceleration force produced in the host vehicle. The gain Kv is the gain for converting the target deceleration force into the target deceleration rate, and is set in advance based on the host vehicle specifications. The first target deceleration rate α*1 is a positive value during acceleration and a negative value during deceleration.

Figure 14:
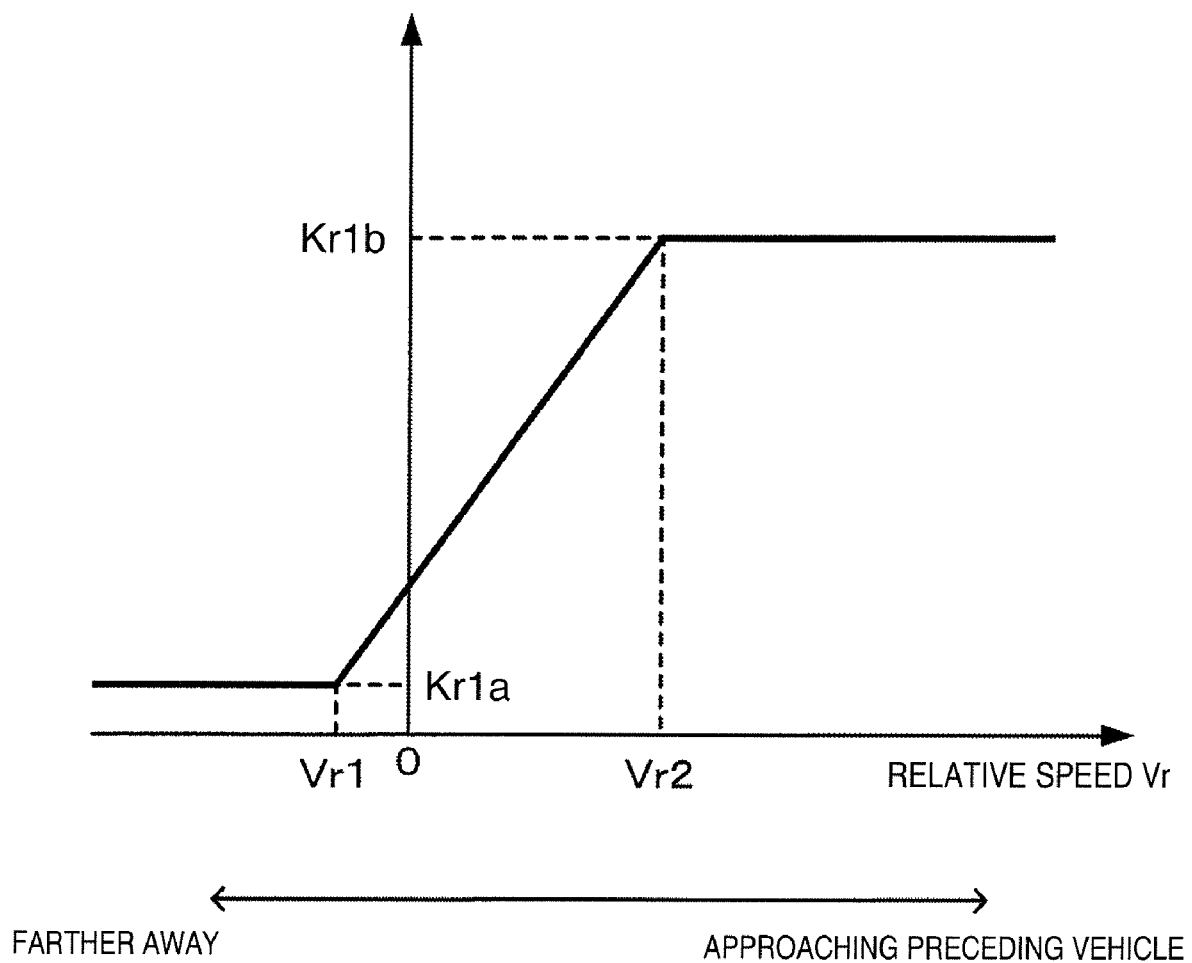
FIG. 14 is a diagram showing the relationship between the relative speed Vr and the gain Kr.

FIG. 14 is a diagram showing the relationship between the relative speed Vr and the gain Kr1. As shown in FIG. 14, the greater the relative speed Vr; i.e., the closer the host vehicle is to the preceding vehicle, the greater the gain Kr1 is; and the smaller the relative speed Vr is, the smaller the gain Kr1 is. When the relative speed Vr is less than a first relative speed Vr1, then the value of the gain Kr1 is set to a first specific gain Kr1a. When the relative speed Vr is greater than a second relative speed Vr2, the value of the gain Kr1 is a second specific gain Kr1b. The table specifying the relationship between relative speed Vr and gain Kr1, as shown in FIG. 14, is stored in advance in the memory (not shown) of the driving/braking force controller 50, and the gain Kr1 is determined based on this table and the relative speed Vr.

As described above, when the accelerator pedal 81 is being depressed (when the accelerator operation flag Facc is "on"), the first target deceleration rate α*1 is 0 because L*1=L. In cases in which the absolute value of the change rate (degree of deceleration) of the first target deceleration rate α*1 calculated from Equation 10 is less than a specific first lower limit Δα*1, the absolute value of the change rate of the first target deceleration rate α*1 is set to the lower limit Δα*1. When the first target deceleration rate α*1 has been calculated, the process advances to step S460.

In step S460, a second target deceleration rate α*2 is calculated from Equation 11, based on the second headway distance threshold L*2 calculated in step S420 and based on the headway distance L from the preceding vehicle detected by the laser radar 70.

$$\alpha^*2 = Kv \times Kr2 \times (L^*2 - L) \quad \text{(Equation 11)}$$

The value Kr2 is the gain for calculating the second target deceleration force produced in the host vehicle, and the value of the second target deceleration rate α*2 when the accelerator pedal 81 is not being depressed (when the accelerator operation flag Facc is "off" and the target drive force τ*t is set to 0). The second target deceleration rate α*2 is a positive value during acceleration and a negative value during deceleration.

Figure 6:
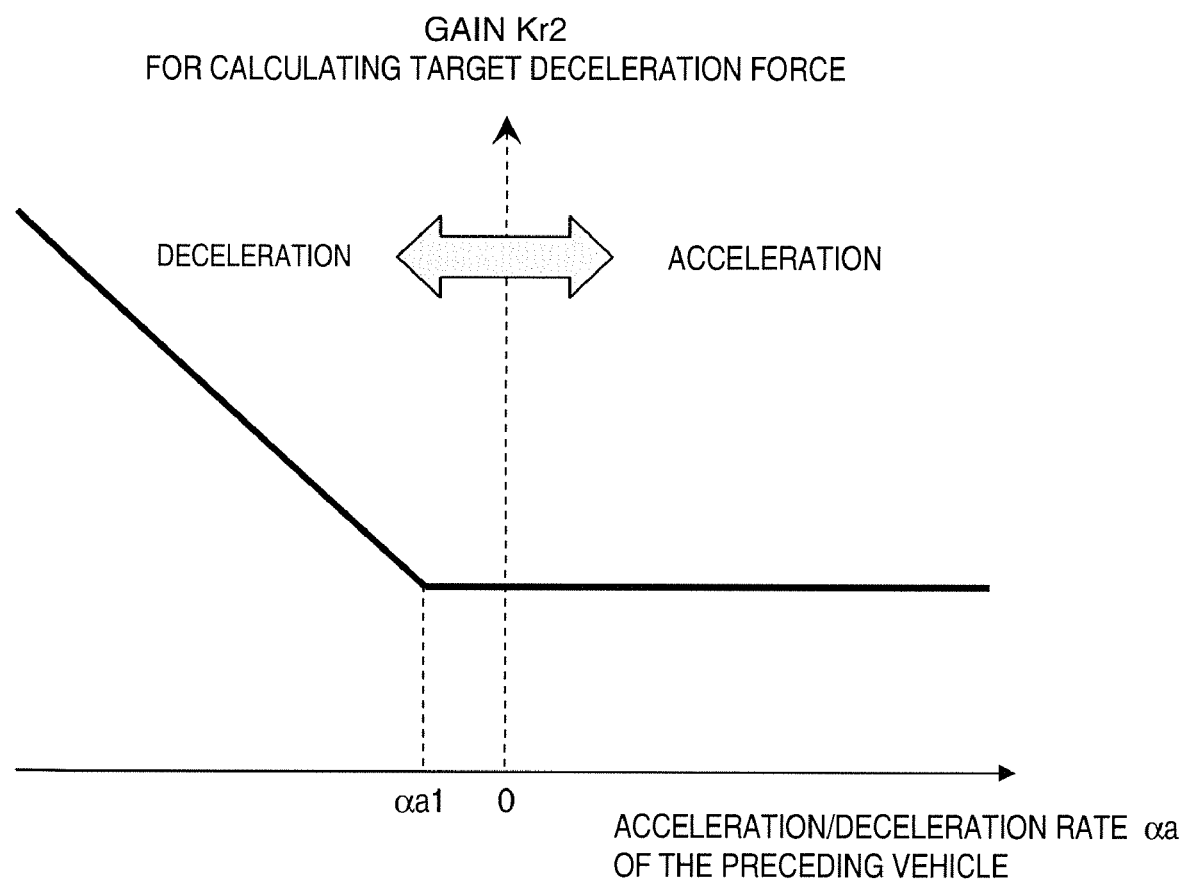
FIG. 6 is a diagram showing the relationship between the gain Kr2 and the acceleration/deceleration speed $\alpha a$ of the preceding vehicle.

FIG. 6 is a diagram showing the relationship between the acceleration/deceleration rate αa of the preceding vehicle and the gain Kr2. As shown in FIG. 6, the lower the acceleration/deceleration rate αa of the preceding vehicle; i.e., the greater the rate of deceleration of the preceding vehicle is, the greater of the gain Kr2 is. The greater the rate of deceleration of the preceding vehicle is, the greater the rate of deceleration of the host vehicle can also be set during deceleration braking. The value of the gain Kr2 is set to a specific value (e.g., 1) in a region in which the acceleration/deceleration rate αa of the preceding vehicle is greater than a specific acceleration/deceleration rate αa1. A table specifying the relationship between the acceleration/deceleration rate αa of the preceding vehicle and the gain Kr2, as shown in FIG. 6, is stored in advance in the memory (not shown) of the driving/braking force controller 50, and the gain Kr2 is determined based on this table and the acceleration/deceleration rate αa of the preceding vehicle.

When the absolute value (degree of deceleration) of the rate of change of the second target deceleration rate α*2 calculated from Equation 11 is greater than a specific second upper limit Δα*2 (Δα*2>α*1), the absolute value of the rate of change of the second target deceleration rate α*2 is limited so as to be equal to or less than the upper limit Δα*2. Increasing the second upper limit Δα*2 past the first upper limit Δα*1 moderately controls deceleration when the headway distance L is less than the first headway distance threshold L*1. Deceleration can be controlled to quickly move the vehicle to an appropriate headway distance when the headway distance is less than the second headway distance threshold L*2 (L*2<L*1). When the second target deceleration rate α*2 is calculated, the process advances to step S470.

In step S470, the final target deceleration rate α* produced in the vehicle is determined. In this step, the first target deceleration rate α*1 calculated in step S450 is compared with the second target deceleration rate α*2 calculated in step S460, and the smaller deceleration rate; i.e., the target deceleration having a greater degree of deceleration is set as the final target deceleration rate α*. In this case as well, the final target deceleration rate α* is a positive value during acceleration and a negative value during deceleration.

In step S480, which follows step S470, braking is controlled based on the final target deceleration rate α*. First, as shown in Equation 12, a target deceleration rate α*brk produced by the brakes is calculated by subtracting a deceleration rate α*eng produced by engine braking from the final target deceleration rate α* determined in step S470.

$$\alpha^*brk = \alpha^* - \alpha^*eng \quad \text{(Equation 12)}$$

The values α*, α*brk, and α*eng are all positive during acceleration and negative during deceleration. When the accelerator pedal 81 is being depressed (when the accelerator operation flag Facc is on), α*brk=0 because α*=α*eng=0.

Next, a target brake fluid pressure P* is calculated from Equation 13 based on the calculated target deceleration rate α*brk.

$$P^* = -(Kb \times \alpha^*brk) \quad \text{(Equation 13)}$$

The value Kb is the gain for converting the target deceleration rate into a target brake fluid pressure, and is set in advance based on the host vehicle specifications. When the accelerator pedal 81 is being depressed (when the accelerator operation flag Facc is on), P*=0 because α*brk=0.

The pressure control unit 5 is then instructed to create a brake fluid pressure based on the calculated target brake fluid pressure P*. Having received this instruction, the pressure control unit 5 creates a brake fluid pressure based on the target brake fluid pressure P*, and supplies the brake fluid pressure to the wheel cylinders 12, 22, 32 and 42. Control for decelerating the vehicle is thereby implemented if the driver is not operating the accelerator pedal 81 when the headway distance L is less than both the first headway distance threshold L*1 and the second headway distance threshold L*2. When the driver is operating the accelerator pedal 81, deceleration control is not implemented because the target brake fluid pressure P*=0.

Upon being completed in step S480, the process returns to step S400. The processes in steps S400 through S480 are thereafter repeated.

The process executed by the driving/braking force controller 50 in step S401 will now be described. In step S401, the torque or force characteristic correction control is implemented for changing the relationship between the actuation amount of the accelerator pedal 81 and the drive force. The processing for changing the relationship between the actuation amount of the accelerator pedal and the drive force will be described with reference to the flowchart shown in FIG. 7.

In step S820 of the flowchart shown in FIG. 2, the driving/braking force controller 50 determines whether the drive force control flag Ft is set to 1. The drive force control flag Ft is set to 1 when a preceding vehicle is detected by the laser radar 70 and in other situations, and the flag is set to 0 when such prescribed conditions have not be satisfied. The prescribed conditions are not limited to the above conditions. Examples of the prescribed conditions also include the case in which the headway distance from the preceding vehicle is equal to or less than a prescribed threshold (e.g., the first headway distance threshold L*1), and the case in which the relative speed has become equal to or greater than a prescribed threshold in the approaching direction. The drive force control flag Ft can be set to 0 when the operator has indicated an intention to change lanes (e.g., when the turn signal has been switched on), or when the lateral displacement of the preceding vehicle with respect to the host vehicle is equal to or greater than a prescribed threshold. The drive force control flag Ft can be set to 1 when the headway maintenance assist system has become operable (when an operating switch (not shown) has been turned on). However, when the accelerator pedal reaction force cannot be applied due to a failure of the accelerator pedal actuator 80 or when the headway maintenance assist system is inoperable, the drive force control flag Ft is set to 0. When the response is in the affirmative in step S820, the process advances to step S830. When, on the other hand, the response is in the negative in step S820, the process advances to step S850.

In step S830, a drive force command value of the target drive force τ*t that is outputted to the drive force controller 60 is calculated. When the accelerator pedal position is low, i.e., when the accelerator pedal 81 is depressed only slightly, it may be difficult for the driver to notice that a reaction force has been applied to the accelerator pedal 81. For example, when the vehicle speed is low, the accelerator pedal position is also generally low, as shown by the solid line in FIG. 8. In view of this situation, the relationship between the accelerator pedal position and the drive force is changed in the following manner so that the driver more readily feels the reaction force on the accelerator pedal, i.e., so that the accelerator pedal 81 is pressed until a prescribed accelerator pedal position αt is reached.

The difference between the prescribed accelerator pedal position αt and the actual (detected) accelerator pedal position is calculated from the relationship between the vehicle speed and accelerator pedal position based on the speed V of the host vehicle. This difference is set as an offset value α of the accelerator pedal position.

The offset value α is subtracted from the current accelerator pedal position Acc, and the drive force corresponding to the accelerator pedal position after the offset value α has been subtracted is set to be the target drive force τ*t. In other words, the relationship between the current accelerator pedal position Acc and the drive force is changed from the ordinary correspondence relationship shown by the broken line in FIG. 9 to the corrected correspondence relationship shown by the solid line. The generated drive force is thereby reduced with respect to the current accelerator pedal position Acc. Therefore, the drive force desired by the driver can no longer be obtained unless the driver presses considerably more than usual on the accelerator pedal 81. For this reason, the driver will press more forcefully on the accelerator pedal 81.

Figure 9:
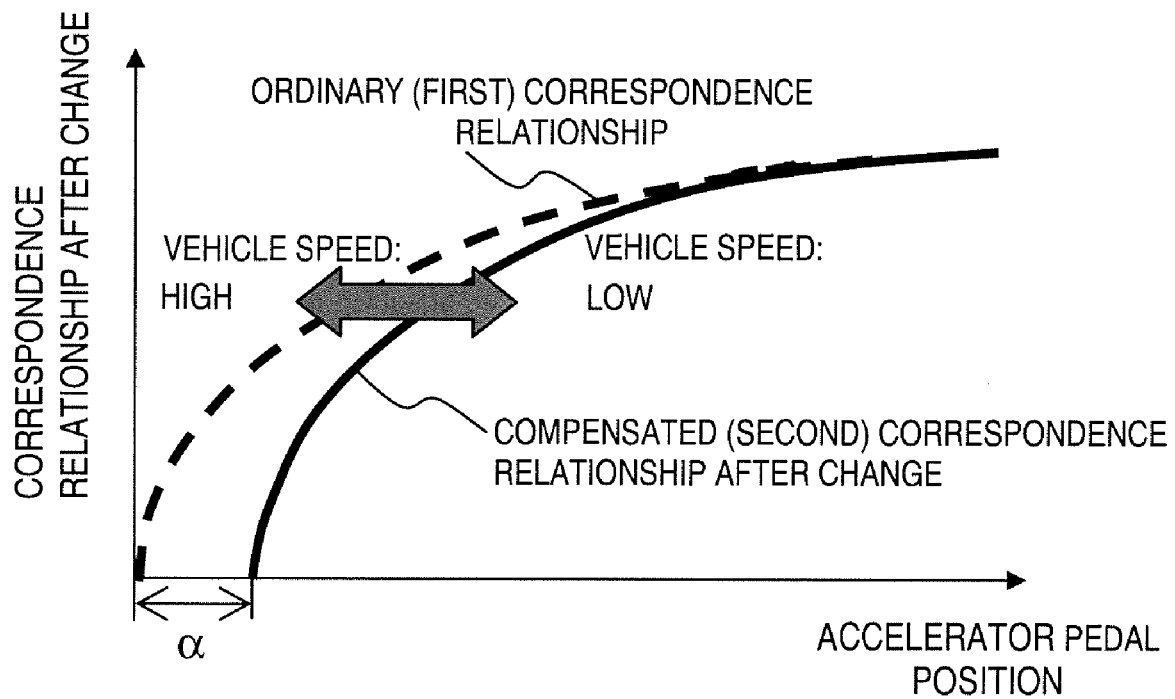
FIG. 9 is a diagram showing the relationship between the accelerator pedal position Acc and the target drive force $\tau^*t$ after a change in the correspondence relationship.

The curve showing the changed correspondence relationship shown by the solid line in FIG. 9 matches the curve showing the ordinary correspondence relationship shown by the broken line when the accelerator pedal position is increased. Therefore, the same drive force as usual can be obtained when the driver has considerably depressed on the accelerator pedal 81, such as in the case of passing the preceding vehicle.

When the value obtained by subtracting the calculated offset value α from the current accelerator pedal position Acc is 0 or less, the target drive force τ*t is set to 0. Then the process advances to step S410 of the flowchart shown in FIG. 2 after the target drive force τ*t has been calculated in step S830.

In step S850, the target drive force τ*t to be outputted to the drive force controller 60 is calculated differently from step S830. In step S850, the drive force corresponding to the current accelerator pedal position Acc is set to be the target drive force τ*t. In other words, the relationship between the current accelerator pedal position Acc and the drive force is set to be the ordinary correspondence relationship shown by the broken line of FIG. 9. When the target drive force τ*t has been calculated in step S850, the process advances to step S410 of the flowchart shown in FIG. 2.

According to the headway maintenance assist system of the illustrated embodiment, the following effects are obtained.

(1) When the drive force control flag Ft is set to 1, the relationship between the current accelerator pedal position Acc and the drive force is changed to a correspondence relationship that is different than an ordinary correspondence relationship. The manner in which the accelerator is manipulated by the driver can thereby be influenced so as to establish an accelerator pedal position that allows the driver to more readily feel the reaction force of the accelerator pedal. Therefore, the driver can be reliably alerted by applying a reaction force to the accelerator pedal.

(2) The generated drive force is configured to decrease with respect to the accelerator pedal position Acc. Therefore, when the drive force control flag Ft is set to 1, the drive force will decrease as long as the accelerator pedal 81 is not depressed with a greater force. Since the driver can be urged to press the accelerator pedal 81 with greater force, the driver can be made to notice with greater certainty that a reaction force has been applied to the accelerator pedal 81.

(3) The offset amount of the current accelerator pedal position Acc is set and the relationship between the current accelerator pedal position Acc and the drive force is changed (corrected) by subtracting the offset value α from the current accelerator pedal position Acc. The control content can thereby be simplified and the reliability of control in the driving/braking force controller 50 can be improved.

(4) When the value obtained by subtracting the offset value α from the current accelerator pedal position Acc is 0 or less, the target drive force τ*t is set to 0. Therefore, the drive force cannot be obtained when the current accelerator pedal position Acc is lower than the accelerator pedal position corresponding to the offset value α. Since the driver can thereby be urged to press the accelerator pedal 81 until at least the accelerator pedal position corresponding to the offset value α is reached, the driver can be made to notice with greater certainty that a reaction force has been applied to the accelerator pedal.

(5) An increase the accelerator pedal position causes the relationship between the accelerator pedal position Acc and the drive force to assume the ordinary correspondence relationship that existed before the offset value α was subtracted from the current accelerator pedal position Acc. The same drive force as usual can thereby be obtained when the driver has pressed on the accelerator pedal 81 with considerable force, as in the case of passing a preceding vehicle. Therefore, the driver's intention to accelerate can be given greater consideration.

Figure 10:
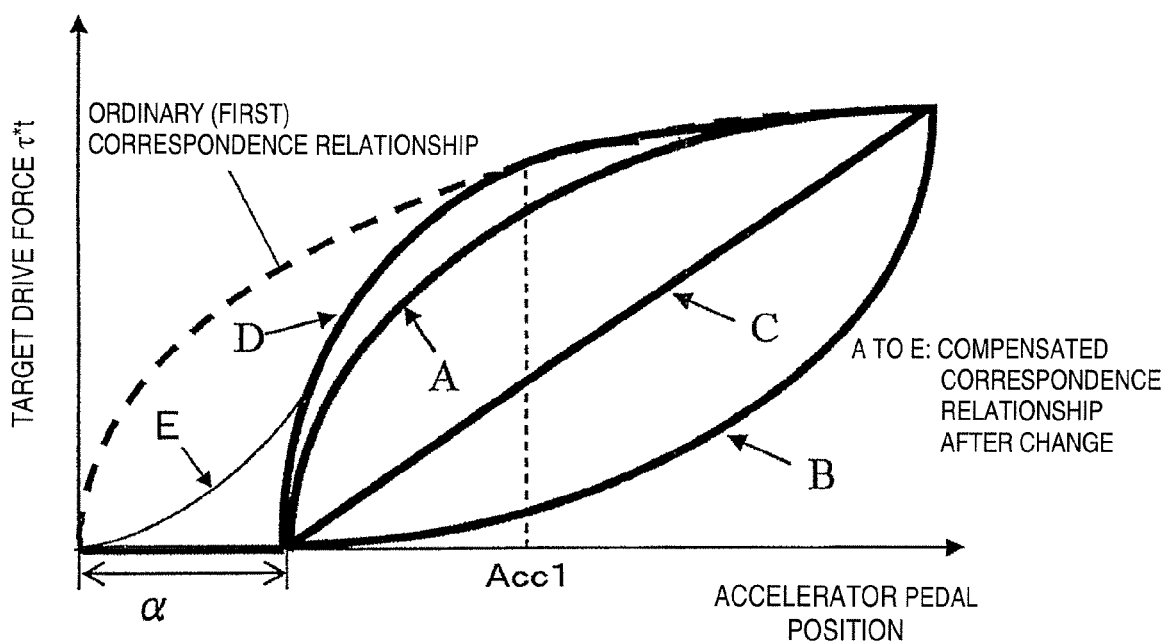
FIG. 10 is a diagram showing another example of the relationship between the accelerator pedal position Acc and the target drive force $\tau^*t$.

The relationship between the current accelerator pedal position Acc and the drive force is not limited to the description above. The relationship can be set so that various characteristics such as those shown by the curves A to E of FIG. 10 are achieved, for example. When, for example, the correspondence relationship between the drive force and the changed accelerator pedal position Acc in FIG. 9 described above is the curve A, the drive force corresponding to the accelerator pedal position can be set so as to be further reduced as shown by the curve B. Although the accelerator pedal 81 responds more slowly when operated by the driver in this case, the acceleration characteristics of the host vehicle are moderated.

The drive force can also be linearly output with respect to the accelerator pedal position, as shown by the curve C. In this case, the acceleration characteristics are more apparent to the driver. When the accelerator pedal position exceeds the accelerator pedal position Acc1, a match can be achieved with the curve that shows the ordinary correspondence relationship indicated by the broken line, as shown by curve D. In this case, since a match is achieved with the curve that shows the ordinary correspondence relationship indicated by the broken line from an accelerator pedal position that is lower than in the case of curve A, the acceleration characteristics can be made to more closely reflect the acceleration intentions of the driver. The positions of the curves shown in FIG. 10 are preferably modified from D to A, A to C, and C to B as the degree of approach between the host vehicle and preceding vehicle increases, i.e., as the headway distance is reduced, or as the relative speed with the preceding vehicle increases in the approaching direction. Also, the curves preferably change in the same manner with a reduction in the vehicle speed V. The drive force characteristics that are in accordance with the vehicle speed and the degree of approach with the preceding vehicle can be obtained by modifying curves in this manner, and the driver can more readily notice the application of reaction force on the accelerator pedal.

In the description above, the target drive force $\tau^*t$ is set to 0 when the accelerator pedal position is less than the offset value $\alpha$, but even when the accelerator pedal position is less than the offset value $\alpha$, as shown by the curve E indicated by the thin solid line, the target drive force $\tau^*t$ may be set to a value that is greater than 0, i.e., so that some drive force can be obtained. The curve may be modified in the direction in which the target drive force is reduced with respect to the accelerator pedal position as the degree of approach to the preceding vehicle increases in the same manner as described above with reference to curve E. Specifically, as the vehicle speed is reduced, the curve E can be modified in the direction of the arrow (from E1 to E3) as the degree of approach increases, as shown in FIG. 12.

Figure 12:
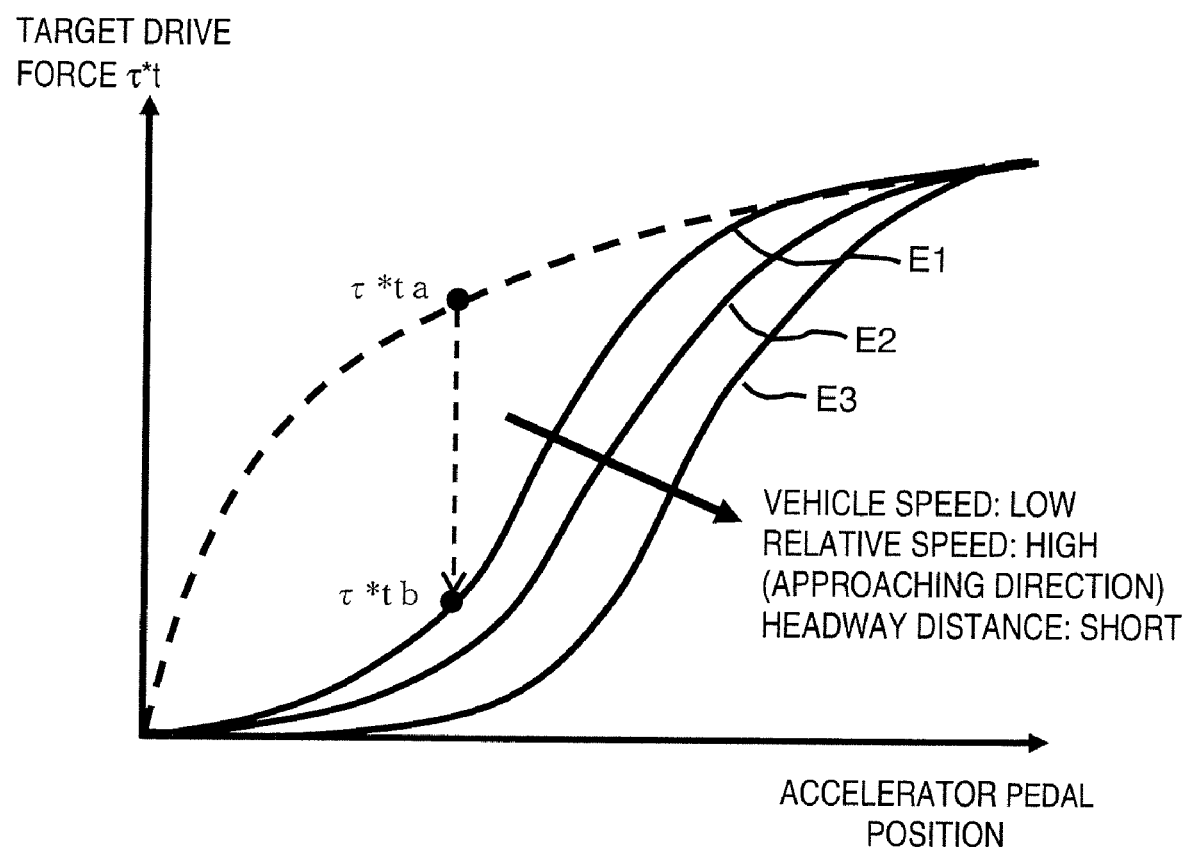
FIG. 12 is a diagram showing an example of the relationship between the accelerator pedal position Acc and the target drive force $\tau^*t$ that illustrates the relationship between the speed V of the host vehicle and the upper limit Ta_max.

The target drive force $\tau^*ta$ is reduced (torque down) to $\tau^*tb$ by modifying the map showing the relationship between the accelerator pedal position Acc and the drive force, but the rate of change (the rate at which the target drive force is changed) at that time may also be modified in accordance with the vehicle speed, the degree of approach (relative speed and headway distance), and other factors, as shown in FIG. 12. Specifically, when the vehicle speed is low, the rate of change of the target drive force is preferably increased in the case that the degree of approach is considerable (the headway distance is low and the relative speed is high in the direction of approach).

Figure 7:
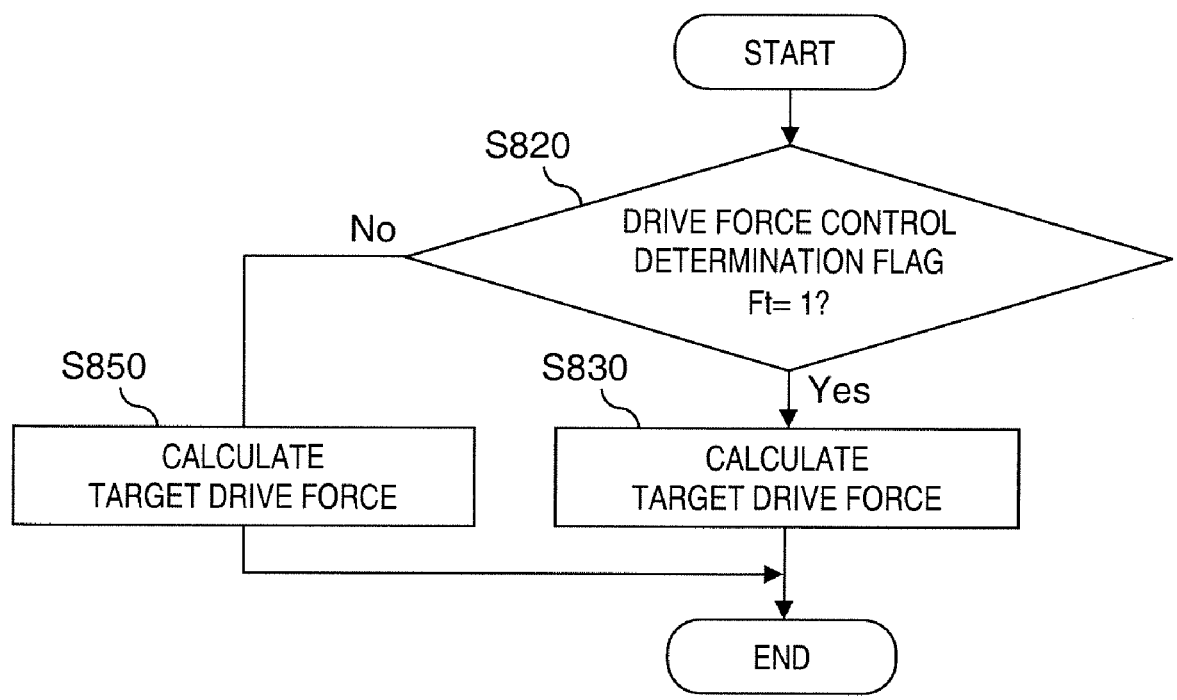
FIG. 7 is a flowchart showing the processing executed for controlling the changes in the relationship between the target drive force and the position of the accelerator pedal.
Figure 8:
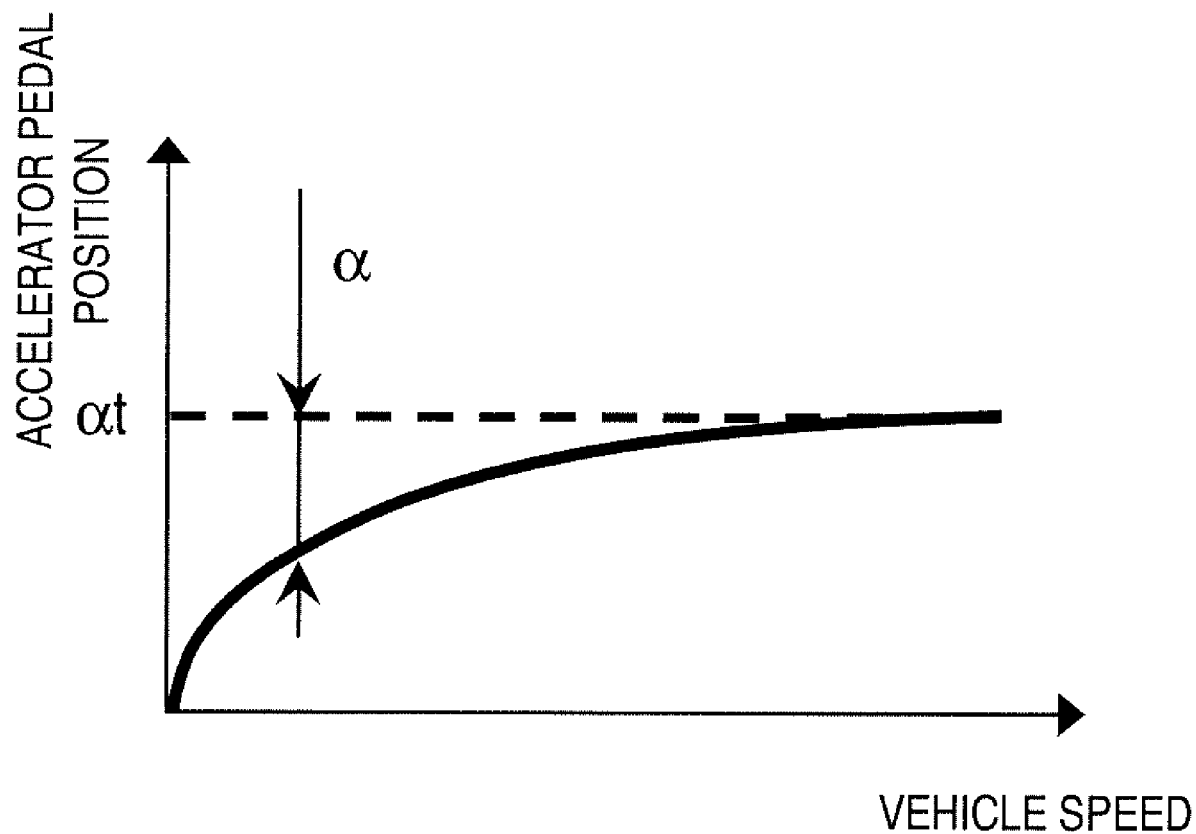
FIG. 8 is a diagram showing the relationship between the vehicle speed V and the accelerator pedal position Acc.

After the relationship between the accelerator pedal position and the target drive force has been compensated, the curve is returned to its original state when the drive force control flag Ft has become 0 in step S820 of FIG. 7. At this point, since the drive force will increase even if the accelerator pedal position remains constant, the driver may be caused to feel uncomfortable when the torque is suddenly increased. Therefore, the torque is preferably increased at a speed that is less than the speed at which the torque is reduced in the manner described above. It is sometimes better to increase the torque at a lower rate of change in accordance with conditions. In cases in which, for example, the relationship between the accelerator pedal position and the drive force is returned to its original state when the preceding vehicle is no longer being detected by the laser radar 70, it is better to further reduce the rate of change of the torque as the headway distance to the preceding vehicle becomes shorter, or as the relative speed in the direction of approaching the preceding vehicle becomes greater. When traffic lanes are narrow, when the number of lanes of the road being traveled is few, and when a congested road is being traveled, the characteristics can be set so that the rate of change of the torque is reduced and acceleration is moderated in rain, snow, or other bad weather, at night, or at other times. Such a configuration allows the drive force to be changed without making the driver uncomfortable.

Figure 11:
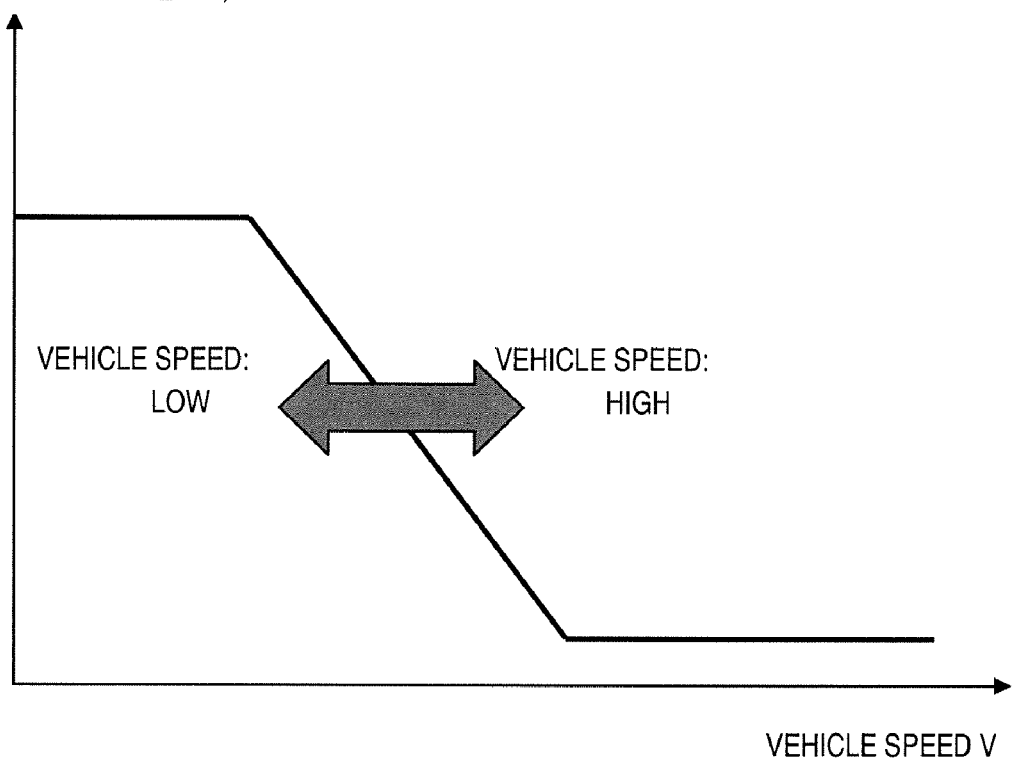
FIG. 11 is a diagram showing an example of the relationship between the speed V of the host vehicle and the headway distance threshold parameter (i.e., the upper limit Ta_max)

The present invention is not limited to the embodiments described above. In the illustrated embodiment, for example, the parameter Tr1 for calculating the transient term L*r1 of the first headway distance threshold was calculated using Equation 2 but an upper limit Ta_max can be established for the calculated value to limit the maximum value, and a lower limit value can also be established to limit the minimum value. The maximum value can be set in accordance with the speed V of the host vehicle, for example. FIG. 11 is a diagram showing an example of the relationship between the speed V of the host vehicle and the upper limit Ta_max. In the same manner, in this modification, upper and lower limit values can be established for the parameter Tr2 for calculating the transient item L*r2 of the second headway distance threshold.

Also, an upper limit $\alpha^*1_{max}$ can be assigned to the first target deceleration rate $\alpha^*1$, and an upper limit $\alpha^*2_{max}$ ($\alpha^*2_{max} > \alpha^*1_{max}$) can be assigned to the second target deceleration rate $\alpha^*2$.

In the illustrated embodiment, the map used for the target drive force was changed, but the present invention is not limited to such a configuration. Rather than changing the map when the target drive force is calculated from the detected value of the accelerator pedal position, the detected value of the accelerator pedal position can be corrected to calculate a virtual accelerator pedal position, and the target drive force can be calculated from the previous map based on the virtual accelerator pedal position. When the map showing the relationship between the accelerator pedal position and the target drive force is to be changed, the corrected map must be calculated with consideration given to the state of the transmission and other factors, but such computation is not required and the relationship between the accelerator pedal position and the target drive force can be easily corrected as long as the detected value itself of the accelerator pedal position is corrected and the virtual accelerator pedal position is calculated.

The steady item L*h2 of the second headway distance threshold in the illustrated embodiment was calculated based on the speed V of the host vehicle and the relative speed Vr, but the calculation can be made by multiplying a prescribed time and the speed of the preceding vehicle, or can be made based on at least one option selected from the speed of the host vehicle, the relative speed, and the speed of the preceding vehicle.

In the above-described embodiments, brake fluid pressure was supplied to the wheel cylinders to reduce the speed of the vehicle, but the vehicle can be caused to decelerate by using engine braking, downshifting, and other types of deceleration control.

In the illustrated embodiment, the deceleration can also be performed using engine braking when the headway distance L is less than the first headway distance threshold L*1, and the deceleration control can be performed by supplying brake fluid pressure to the wheel cylinders 12, 22, 32 and 42 when the headway distance is less than the second headway distance threshold L*2. In this case, the user can discern between deceleration control that is performed when the headway distance L is less than the first headway distance threshold L*1, and deceleration control that is performed when the headway distance L is less than the second headway distance threshold L*2.

In the illustrated embodiment described above, the acceleration pedal reaction force control was performed for applying reaction force to the acceleration pedal 81 as long as the driver was operating the acceleration pedal 81 when the headway distance L between the host vehicle and the preceding vehicle was less than the headway distance threshold L*. Another possibility is to vibrate the acceleration pedal 81 instead of applying reaction force to the acceleration pedal 81. Thus, the accelerator pedal actuator 80 can include a vibration imparting device that constitutes a haptic information conveying section that is configured and arranged to convey a risk potential to a driver as haptic information through the acceleration pedal 81.

In the illustrated embodiment, the larger target deceleration rate selected from the first target deceleration rate α*1 and the second target deceleration rate α*2 was set as the final target deceleration rate to carry out deceleration control of the vehicle. However, deceleration control of the vehicle can be carried out after the first target brake fluid pressure P*1 has been calculated based on the first target deceleration rate α*1, the second target brake fluid pressure P*2 has been calculated based on the second target deceleration rate α*2, and the larger of the two target brake fluid pressures has been set as the final target brake fluid pressure.

In the illustrated embodiment, the difference between the prescribed accelerator pedal position αt and the accelerator pedal position was calculated from the vehicle speed and the accelerator pedal position based on the host vehicle speed V, as shown in FIG. 13, and this difference was set to be the offset value α of the accelerator pedal position, but the present invention is not limited by this configuration. The prescribed accelerator pedal position αt can be a constant value such as a position of 25%, and can be a value that corresponds to the headway distance L, the relative speed Vr, or another parameter.

The offset value α can be varied using a gear position of the transmission, the engine speed, the slope of the road surface, or other parameters. In the case that the offset value α is varied using a gear position of the transmission, a higher offset value can be used for a higher gear position, or an offset value αgr that corresponds to the gear position can be looked up in a map. In the case that the offset value α is modified using the engine speed, the offset value α can be increased as the engine speed is reduced, or an offset value α that corresponds to the engine speed can be looked up in a map. In the case that the offset value α is modified using the slope (inclination) of the road, the offset value α can be set higher on an uphill slope and lower on a downhill slope, whereby an unwanted situation can be prevented in which the host vehicle ceases to accelerate when the accelerator pedal position is low on an uphill slope.

A suitable offset value α can be calculated in accordance with the state of obstacles in the forward direction and the running condition of the host vehicle by setting the prescribed accelerator pedal position αt and offset value α in such a manner. Since the relationship between the accelerator pedal position Acc and the drive force can thereby be changed in accordance with the state of obstacles in the forward direction and the running condition of the host vehicle, the driver can be appropriately alerted by the application of accelerator reaction force in accordance with the traveling environment.

In the headway maintenance assist system of the illustrated embodiment, the vehicle was caused to decelerate as long as the driver was not operating the accelerator pedal 81 when the headway distance L between the host vehicle and the preceding vehicle had become less than the first headway distance threshold L*1. However, the present invention is not limited to this configuration. The headway maintenance assist system of the illustrated embodiment can also be configured so that deceleration control does not occur even when the headway distance L between the host vehicle and the preceding vehicle has become less than the first headway distance threshold L*1 under certain running conditions.

When the drive force control flag Ft is set to 1 as described in the illustrated embodiment, a control routine whereby the relationship between the accelerator pedal position Acc and the drive force is changed to a correspondence relationship that is different from an ordinary correspondence relationship can be applied to a variety of apparatuses for alerting the driver by applying a reaction force to the accelerator pedal.

In the headway maintenance assist system of the illustrated embodiment, the relationship between the output torque of the engine 6 and the accelerator pedal position is changed by changing the relationship between the accelerator pedal position and the target drive force τ*t outputted to the drive force controller 60, but the present invention is not limited to this configuration, and the relationship between accelerator pedal position and the drive force τt in the wheel shafts can be changed, for example, by changing the gear ratio of an automatic transmission, changing the output torque of a motor (e.g., electric motor) other than the engine 6, or by making other changes.

In the illustrated embodiment, the laser radar 70 basically corresponds to the preceding vehicle detection means. The accelerator pedal position sensor 56 basically corresponds to the accelerator actuation amount detection means. The accelerator pedal actuator 80 basically corresponds to the actuation reaction force generation means. The sensors 13, 23, 33, 43, and 52 to 56 and the laser radar 70 basically correspond to the running condition detecting means. The drive force controller 60 basically corresponds to the drive source control means. The driving/braking force controller 50 basically corresponds to the accelerator actuation reaction force calculation means, the driving force determination means, and the compensation means.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle headway maintenance assist system comprising:
    a preceding vehicle detection section configured to detect a headway distance between a host vehicle and a preceding vehicle;
    a reaction force generating section configured to generate a reaction force to be applied to an accelerator based on the headway distance detected by the preceding vehicle detection section; and
    a control section configured to control a relationship between a driving force and an accelerator actuation amount by a driver to increase the accelerator actuation amount at a time before the reaction force generating section generates the reaction force.

2. The vehicle headway maintenance assist system according to claim 1, wherein
    the control section is configured to reduce a target driving force with respect to the accelerator actuation amount when the increase in the accelerator actuation amount occurs.

3. The vehicle headway maintenance assist system according to claim 1, wherein
    the control section is configured to set an offset amount of the accelerator actuation amount associated with the increase in the acceleration actuation amount.

4. The vehicle headway maintenance assist system according to claim 3, wherein
    the control section is configured to change a target driving force to zero when the accelerator actuation amount is less than the offset amount.

5. The vehicle headway maintenance assist system according to claim 3, wherein
    the control section is configured to change a magnitude of the offset amount in accordance with a running condition of the host vehicle.

6. The vehicle headway maintenance assist system according to claim 1, wherein
    the control section is further configured to prohibit changing the relationship between the driving force and the acceleration actuation amount when the accelerator actuation amount has exceeded a prescribed value.

7. The vehicle headway maintenance assist system according to claim 1, further comprising
    a running condition detection section configured to calculate an approach rate between the host vehicle and the preceding vehicle based on the headway distance detected by the preceding vehicle detection section; and
    wherein the control section is configured to change a relationship between a target driving force and the accelerator actuation amount so that the target driving force decreases with respect to the accelerator actuation amount as the approach rate increases.

8. The vehicle headway maintenance assist system according to claim 1, further comprising
    a running condition detection section configured to detect at least one of a vehicle speed, a rotational speed of an output shaft of the drive source, a state of a transmission for reducing and transmitting a speed of the output of the drive source to a drive wheel, and a road surface inclination as a running condition that is used by the control section to control the relationship between the driving force and the accelerator actuation amount.

9. The vehicle headway maintenance assist system according to claim 1, wherein
    the control section is configured to change a target driving force.

10. The vehicle headway maintenance assist system according to claim 1, wherein
    the control section is configured to change the accelerator actuation amount and provide a compensated accelerator actuation amount for use in determining a target driving force.

11. The vehicle headway maintenance assist system according to claim 1, further comprising
    a running condition detection section configured to determine whether the reaction force generating section is in an operable state; and
    wherein the control section is configured to increase the accelerator actuation amount when the running condition detection section has determined that the reaction force generating section is in an operable state.

12. The vehicle headway maintenance assist system according to claim 1, further comprising
    a running condition detection section configured to determine whether the host vehicle and the preceding vehicle are in a prescribed positional relationship detected by the preceding vehicle detection section; and
    wherein the control section is further configured to increase the accelerator actuation amount when the running condition detection section has determined that the host vehicle and the preceding vehicle are in the prescribed positional relationship.

13. The vehicle headway maintenance assist system according to claim 1, further comprising
    a running condition detection section configured to detect at least one of a vehicle speed, a path of the preceding vehicle, and a relative speed between the host vehicle and the preceding vehicle as a detected condition that is used by the control section to control the relationship between the driving force and the accelerator actuation amount; and
    a drive source control section configured to change a return rate of change of a target driving force when the control section returns the accelerator actuation amount to a value before the increase.

14. The vehicle headway maintenance assist system according to claim 1, further comprising
a drive source control section configured to set a return rate of change of a target driving force when the control section returns the accelerator actuation amount to a value before the increase, with the return rate of change of the target driving force being less than a compensating rate of change of the target driving force that occurred when the control section caused the increase in the accelerator actuation amount.

15. A vehicle headway maintenance assist system comprising:
preceding vehicle detection means for detecting a headway distance between a host vehicle and a preceding vehicle;
actuation reaction force generation means for generating a reaction force to be applied to an accelerator based on the headway distance detected by the preceding vehicle detection means; and
control means for controlling a relationship between a driving force and an accelerator actuation amount by a driver to increase the accelerator actuation amount at a time before the actuation reaction force generating means generates the reaction force.

16. The vehicle headway maintenance assist system according to claim 15, wherein
the control means reduces a target driving force with respect to the accelerator actuation amount when the increase in the accelerator actuation amount occurs.

17. The vehicle headway maintenance assist system according to claim 15, wherein
the control means sets an offset amount of the accelerator actuation amount associated with the increase in the acceleration actuation amount.

18. A vehicle headway maintenance assistance method comprising:
detecting a headway distance between a host vehicle and a preceding vehicle;
generating a reaction force to be applied to an accelerator based on the headway distance detected; and
controlling a relationship between a driving force and an accelerator actuation amount by a driver to increase the accelerator actuation amount at a time before the reaction force is generated.

19. The method according to claim 18, further comprising reducing a target driving force with respect to the accelerator actuation amount when the increase in the accelerator actuation amount occurs.

20. The method according to claim 18, further comprising setting an offset amount of the accelerator actuation amount associated with the increase in the acceleration actuation amount.

* * * * *